US 6,631,270 B1

United States Patent
Dolan

(10) Patent No.: US 6,631,270 B1
(45) Date of Patent: Oct. 7, 2003

(54) METHOD AND APPARATUS FOR CALL COMPLETION IN CONGESTED CELLS

(75) Inventor: Tommy Dolan, Co Dublin (IE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/453,905

(22) Filed: Apr. 5, 2000

(51) Int. Cl.[7] .................................................. H04Q 7/20
(52) U.S. Cl. .................... 455/453; 455/422.1; 455/445; 455/452.1; 455/456.1; 455/436.1; 455/440
(58) Field of Search ................................ 455/450, 452, 455/453, 509, 510, 514, 445, 528

(56) References Cited

U.S. PATENT DOCUMENTS

| | | | | |
|---|---|---|---|---|
| 5,287,545 A | * | 2/1994 | Kallin | 455/33.1 |
| 5,311,583 A | | 5/1994 | Friedes et al. | |
| 5,423,062 A | * | 6/1995 | Sakakura | 455/54.1 |
| 5,533,100 A | * | 7/1996 | Bass et al. | 379/67 |
| 5,548,533 A | * | 8/1996 | Gao et al. | 364/514 |
| 5,627,875 A | | 5/1997 | Kapsales | |
| 5,754,959 A | * | 5/1998 | Uneo et al. | 455/453 |
| 5,802,161 A | * | 9/1998 | Svoronos et al. | 379/216 |
| 6,064,892 A | * | 5/2000 | Miyagawa et al. | 455/560 |
| 6,212,389 B1 | | 4/2001 | Fapojuwo | 455/453 |
| 6,324,403 B1 | * | 11/2001 | Jalloul | 455/453 |
| 6,343,216 B1 | * | 1/2002 | Kim et al. | 455/450 |

FOREIGN PATENT DOCUMENTS

| | | |
|---|---|---|
| EP | 0491494 | 6/1992 |
| EP | 0871315 | 10/1998 |
| EP | 0942614 | 9/1999 |
| WO | 99/49678 | 9/1999 |
| WO | 99/65258 | 12/1999 |

* cited by examiner

Primary Examiner—William Trost
Assistant Examiner—Meless Zewdu

(57) ABSTRACT

A method and apparatus for providing a call completion service in a wireless communication system are described. A call attempt is completed between a calling party and a called party encountering congestion in a respective cell, by storing information related to the call attempt, monitoring a congestion level and setting up a call to complete the call attempt when traffic channels are available provided the parties are still within the cell coverage area. A predetermined number of available traffic channels may be required so as to prevent further congestion caused call completion. When determining that the called or calling party is within a new cell, congestion level is determined in the new cell and the call is completed if congestion levels are favorable. When the call can be set up the calling party is contacted and confirmation requested. Notification is provided to the parties that the call attempt was not completed, prompting the parties to indicate whether the call attempt should be completed or whether additional stored call attempts should be re-attempted. A call completion service for an established call may be provided by a method and apparatus configured to detect a handoff attempt to a new cell, determine that congestion has occurred, store information related to the handoff attempt, monitor information related to the handoff attempt to determine if the cell is still congested and if the parties are still within the coverage area whereupon a call may be set up.

10 Claims, 6 Drawing Sheets

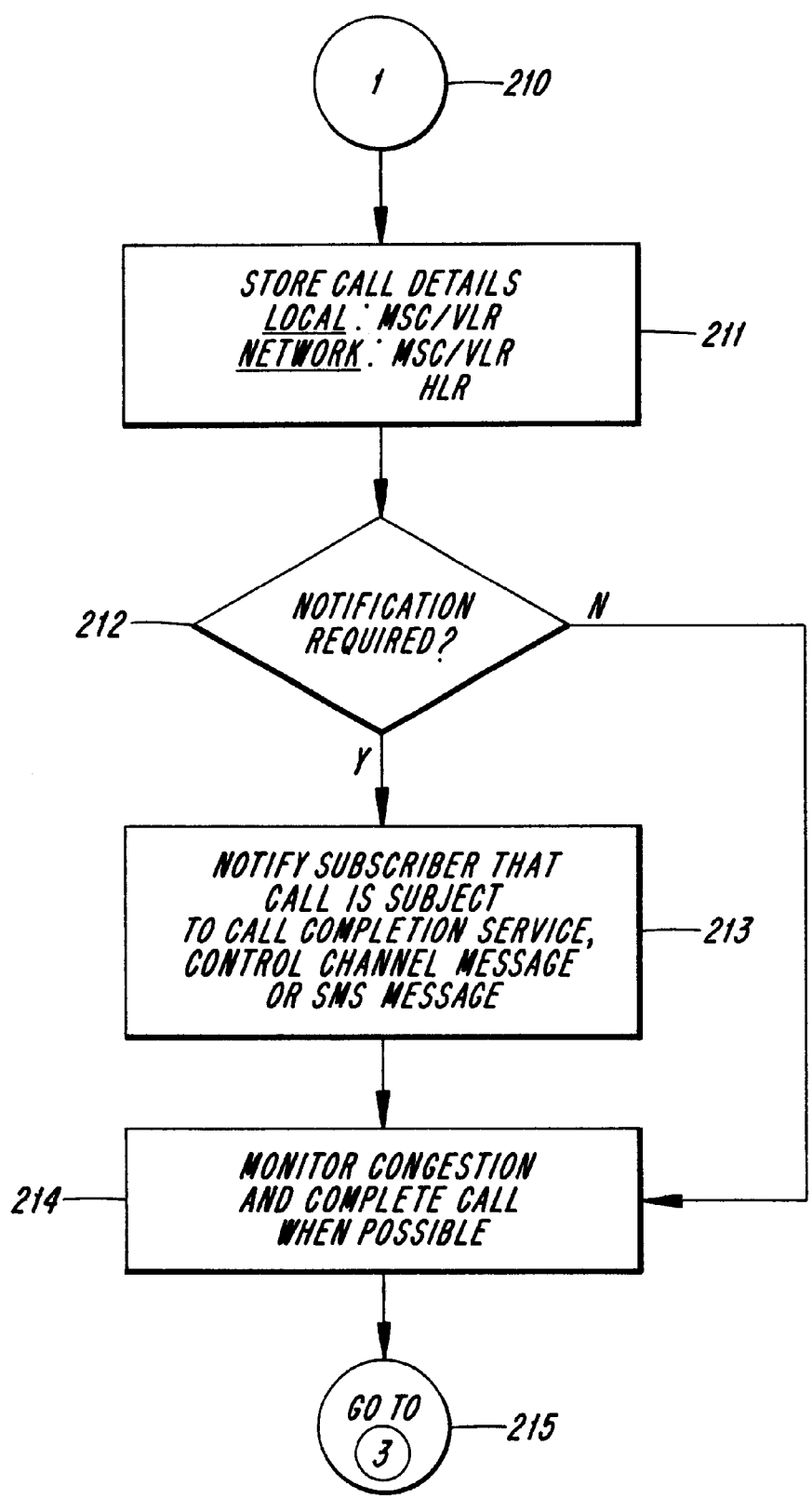

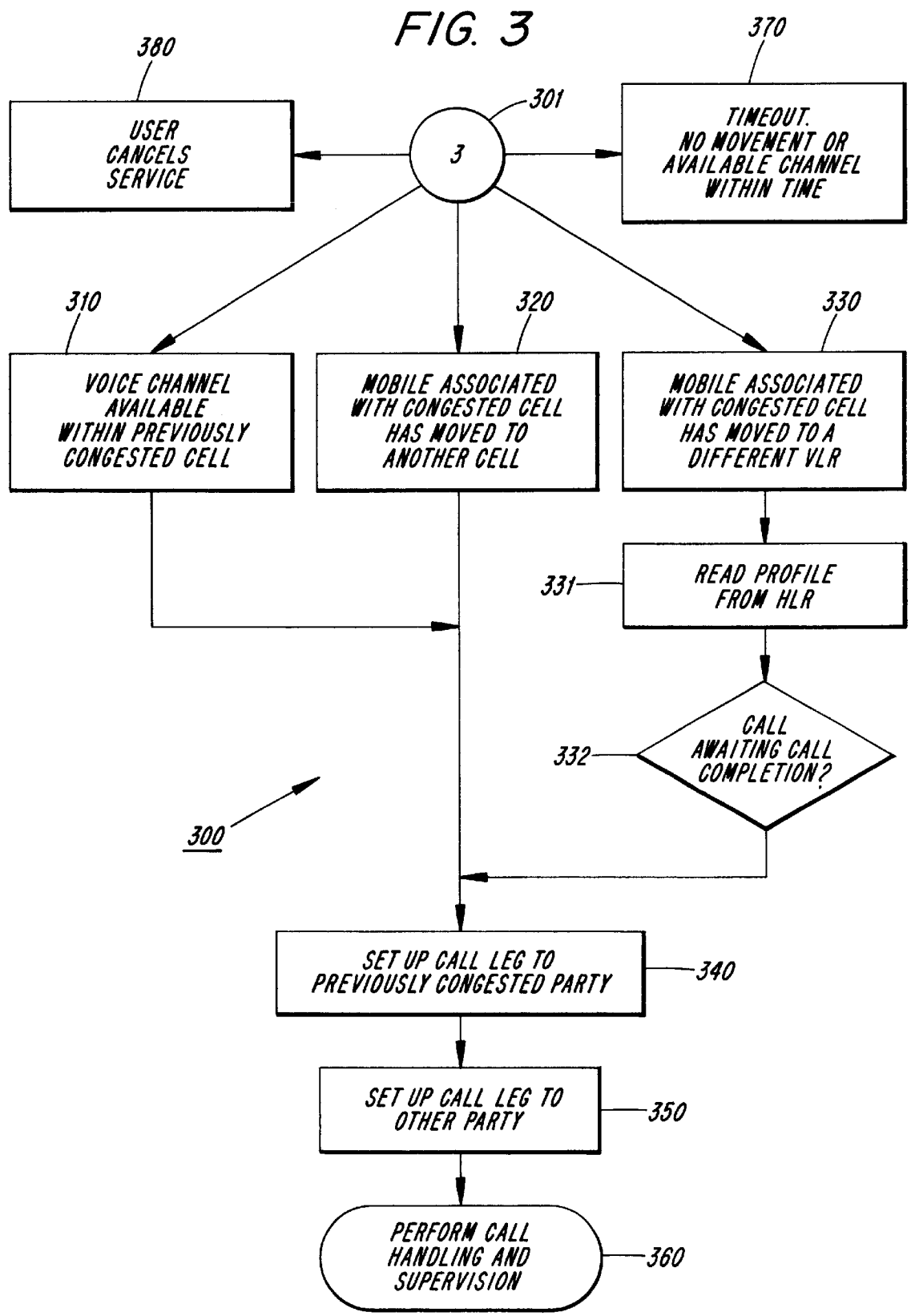

METHOD AND APPARATUS FOR CALL COMPLETION IN CONGESTED CELLS

CROSS-REFERENCE TO RELATED APPLICATIONS

Not Applicable

STATEMENT REGARDING FEDERALLY SPONSORED RESEARCH

Not Applicable

REFERENCE TO A MICROFICHE APPENDIX

Not Applicable

BACKGROUND OF THE INVENTION

1. Description of Related Art

Not Applicable

2. Field of the Invention

The present invention relates to call setup and call control in a wireless communication system. More particularly, the present invention relates to a method and apparatus for providing call setup and call control in congested wireless cells.

Presently, when a mobile call setup is being attempted and congestion is encountered within a calling or a called cell, a number of options are available to call setup related network elements within the wireless communication system including, for example, directed re-try. Directed re-try involves a Mobile Switching Center (MSC) attempting to direct call setup from the original, congested cell to a neighboring cell, or the like, which is not congested and which is capable of providing alternate service to a called or calling mobile station (MS). Another option, in the case of calling cell congestion, is to queue the calling MS's request to the MSC for a traffic channel until channel resource availability improves. The queuing process involves the calling MS remaining on the call until a traffic channel is available, which is preferably a small duration of time. It should be noted that the duration for which the call can be in a queue waiting for a traffic channel is limited as other key resources are seized. It should further be noted that subscriber services may exist relating to call completion (e.g. call completion on busy or call completion on no reply). These call completion services are based on the status of the called subscriber, and not based on cell congestion.

Several problems and undesirable consequences arise in relation to cell congestion, which may occur on either the originating or terminating side of a call, when attempting to seize a traffic channel within a cell. In some situations, the consequences may be as simple as the calling party re-attempting the call at a later time. Congestion may of course be reencountered at the later time also. In some cases the calling party may not make a reattempt at a later time or make subsequent re-attempts if the initial re-attempt was unsuccessful. For a wireless communication system operator or service provider, an ultimate failure to re-attempt a call means a loss of revenue.

In addition, undesirable consequences may arise related to the calling party being frustrated by inability to complete the call based on the congested status of the network and further, has no means of knowing when the congested status of the network has changed.

Thus, it can be seen that while the above mentioned methods such as queueing and directed re-try address certain issues and problems, the difficulty posed by, for example, the inability of either the calling or called parties to know if a network is no longer congested remains unaddressed.

It would be appreciated therefore in the art for a system which would provide, for example, the calling party a way to be in a position to make a previously failed call once cell congestion has disappeared.

It would further be desirable for the called party to receive calls that could not be received due to congestion.

It would still further be desirable for the operator or service provider to maximize the system capacity by increasing overall call throughput particularly during intervals associated with traffic peaks by minimizing the impact of congestion during traffic peaks.

BRIEF SUMMARY OF THE INVENTION

To reduce the impact of cell congestion, a method and apparatus for providing a call completion service in at least one service area associated with a wireless communication system are described. The call completion service may be provided for completing a call attempt originated between a calling party and a called party at either end of the call. It should be noted that in accordance with various embodiments of the present invention, the call completion service may be provided to a calling party when the calling party is a mobile station originating a call, when congestion is encountered in the cell or cells which are providing service to the calling party. The call completion service may further be provided to either a calling party or called party when the called party is a mobile station intended to terminate a call, when cell congestion is encountered in the cell or cells providing service to the called party. It should further be noted that the calling party in a case of congestion encountered in the called party's cell may be a mobile station, a PSTN subscriber or any originating calling type. Thus a call completion service in accordance with the present invention may be provided as described above for calls placed from a mobile station (MS) to another MS within the same or different service areas, from a PSTN subscriber or any originating station type, to a MS, or from a MS to a PSTN subscriber or any terminating station type.

In accordance with one embodiment of the present invention, it may be determined that congestion has occurred in at least one cell associated with the call attempt whereupon information related to the call attempt may be stored, for example, in a storage register, such as a Visitor Location Register (VLR), associated with an MSC in the one or more coverage areas where the cell congestion was encountered. Information related to the call attempt may be monitored including one or more of: position information associated with the called and calling parties and information associated with the at least one cell to determine if congestion is still present. If the one or more of the called and calling parties is still within the coverage area associated with the at least one cell, based on, for example, any one of the following: registration of the one or more of the calling and the called parties in a new respective cell, call-related activity associated with the one or more of the calling and the called parties in the new respective cell, messaging activity associated with the one or more of the calling and the called parties in the new respective cell, unanswered paging messages associated with the one or more of the calling and the called parties in the respective cell, answered paging messages associated with the one or more of the calling and the called parties in the new respective cell, control channel activity associated with the one or more of the calling and the called parties in the new respective cell, or mobile positioning information associated with the one or more of the one or more calling and the called parties indicating that the one or more of the calling and the called parties is within the coverage area associated with the new respective cell position information, then a call may be set up between the calling party and the called party when it is determined that congestion is no longer present. It should be noted that a level of congestion may be determined, for example, by the presence of an available traffic channel in the cell. Alternatively, a congestion level may be determined based on the availability of a predetermined number of traffic channels. By selecting the predetermined number according to, for example, usage information associated with the cell, which usage information may be incorporated into, for example, channel utilization calculations, or the like, as may be known in the art, further congestion in the cell may be prevented. If it is determined that the party that encountered congestion is not within the coverage area of the congested cell and it is further determined that the party is within the coverage area of at least one new cell and it is still further determined that congestion is not present in the new cell, then a call may be set up between the calling party and the called party.

In accordance with another embodiment of the present invention, the calling party may be contacted when it is determined that congestion is no longer present to request confirmation that the call associated with the call attempt should be set up. Thereafter, upon confirmation by the calling party the call may be set up.

In still another embodiment of the present invention, a call completion service may be provided for completing an established call between a calling party and a called party where cell congestion is encountered resulting in a failed handoff attempt. Accordingly, a failed handoff attempt to a new cell may be detected during the established call whereupon it may be determined that congestion has occurred in the new cell and/or in the present cell. If congestion is present in the new cell resulting in the call being dropped, information related to the failed handoff attempt may be stored and information related to the failed handoff attempt may be monitored including: position information associated with the called and calling parties and information associated with the existing and new cell to determine a congestion level and to determine if the parties are still within the coverage area. A congestion level may be determined in one or more new respective cells and a call may be set up between the calling party and the called party responsive to the determined congestion level in one of the or more new respective cells. Congestion levels may be determined for example based on whether a traffic channel becomes available or whether a predetermined number of traffic channels become available.

BRIEF DESCRIPTION OF THE SEVERAL VIEWS OF THE DRAWINGS

The objects and advantages of the invention will be understood by reading the following detailed description in conjunction with the drawings, in which:

FIG. 2B is a flowchart illustrating further exemplary steps in accordance with another exemplary embodiment of the present invention;

FIG. 3 is a flowchart illustrating exemplary steps in accordance with an exemplary embodiment of the present invention.

DETAILED DESCRIPTION OF THE INVENTION

Figure 1:
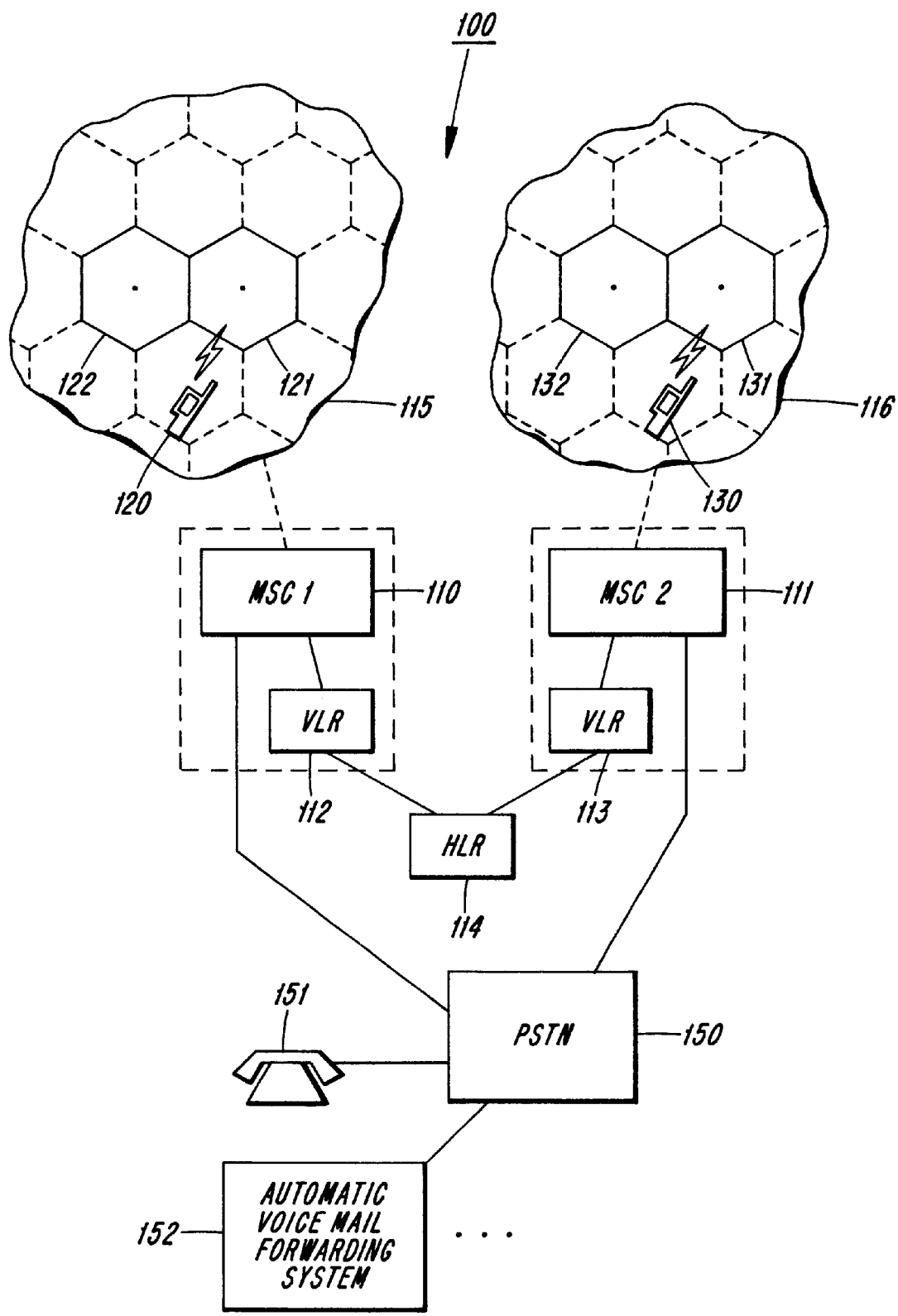
FIG. 1 is a diagram illustrating an exemplary wireless communication system.

The various features of the invention will now be described with reference to the figures, in which like parts are identified with the same reference characters.

Thus, in accordance with the present invention, a solution to the above mentioned problems and disadvantages may be solved by monitoring the calling or called cell for abatement congestion situation has been removed. Once congestion associated with the called or calling cell dissipates, a wireless communication system in accordance with the present invention may set up a previously attempted call between the calling party and the called party.

Exemplary wireless communication system 100 is illustrated in FIG. 1, and may include MSC 1 110 and MSC 2 111, Visitor Location Register (VLR) 1 112 and VLR 2 113 and Home Location Register (HLR) 114. MSC 1 110, for example, may control switching within service area 115 associated with MS 120, and MSC 2 111, for example, may control switching within service area 116 associated, for example, with MS 130. It should be noted that although service areas 115 and 116 are shown as separated, it is possible that they could be adjacent areas as part of a contiguous coverage area. It should further be noted that while MSC 1 110 and VLR 1 112; and MSC 2 111 and VLR 2 113 are shown as separate entities or boxes, they could be embodied together as illustrated with a dotted line. PSTN interface 150, and additional elements will be described in greater detail herein after.

As will be appreciated by one skilled in the art, MSC 1 110, may be used to switch calls, for example, from MS 120, shown as within cell 121 within service area 115, to other entities within communication system 100 such as for example, MS 130 shown as within cell 131 of within service area 116. It should be noted that MS 130 and MS 120 may be associated with the same MSC service area using the same HLR, different MSC service areas using the same HLR, or in different MSC service areas and different HLR service areas. It should further be noted that a call completion service upon cell congestion in accordance with the present invention may further be provided to a party having equipment, such as, for example, POTS telephone set 151, automatic voice mail forwarding system 152, or the like, located within PSTN 150. Such a party may originate a call to a called mobile party, such as, for example, MS 130 within the wireless network, provided the call completion service is supported by one or both parties as will be described in greater detail hereinafter.

Figure 2A:
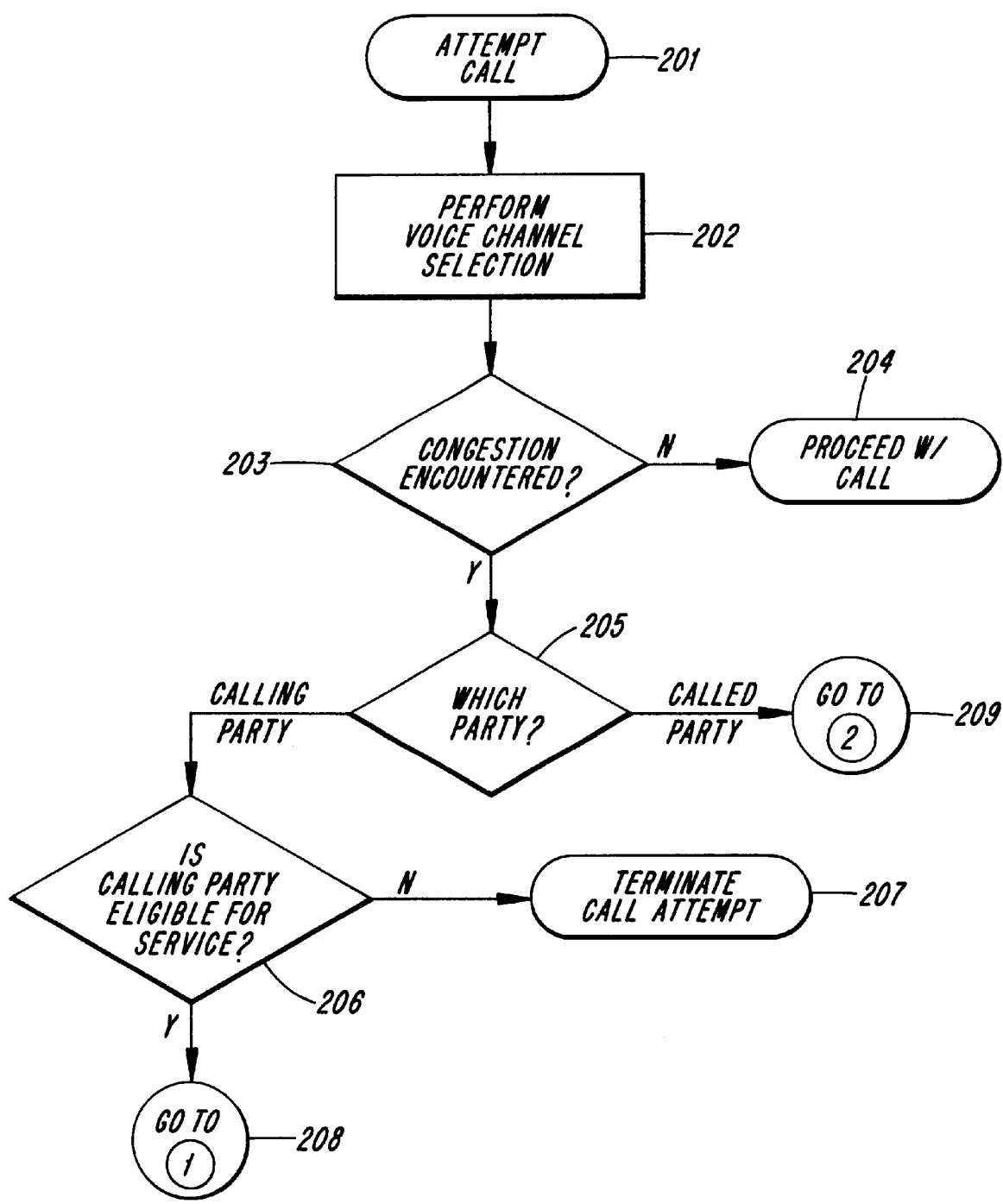
FIG. 2A is a flowchart illustrating exemplary steps in accordance with one exemplary embodiment of the present invention.

A call completion service may be provided upon cell congestion in accordance with one exemplary embodiment of the present invention, as shown in the flowchart illustrated in FIG. 2A. After call attempt 201 is made by a calling party, such as, for example, MS 120 or POTS telephone set 151, traffic channel selection 202 made be made in an attempt to seize a traffic channel or channels in a cell or cells associated with either or both the called and the calling party. Wireless communication system 100 may detect congestion in step 203 in a conventional manner. For example, by failing to seize a traffic channel, congestion may be presumed. It should be noted that cell congestion may further be defined as the unavailability of any resource within a cell necessary for the set up of a call within a cell, e.g. lack of an available unoccupied transcoder device (not shown). In step 205, a determination is made regarding which cell, e.g. the calling or the called party's cell is congested and, if the calling party's cell is congested then, a determination is made at step 206 whether the subscriber is eligible for the service. If not, the call attempt may be terminated at step 207. If the subscriber is eligible, then processing flow may proceed to branch 1 at 208. If the called party's cell is congested, then processing flow may proceed to branch 2 at 209. Processing associated with both branch 1 and branch 2 are described in greater detail hereinafter.

As is illustrated in FIG. 2B, wireless communication system 100 may proceed with processing flow at branch 1 at step 210 and may store information associated with the call at step 211, such as, for example, calling party number; called party number; and call profile details. Call information may further be stored, for example, in MSC 1 110 or VLR 112 for an embodiment where a call completion service in accordance with the present invention is provided locally; and in MSC 1 110, VLR 112, and HLR 114 in a network wide embodiment. Once call details are stored at step 211, a determination may be made at step 212 whether notification is required as part of the service features associated with the call completion service in accordance with the present invention for the particular subscriber or subscribers affected. It should be noted that a notification to a calling party may be provided in the case where congestion is encountered in the originating or calling party's cell.

If notification is required due to congestion encountered in the originating cell, then notification in any of the forms to be described herein after may be performed in step 213, wherein the subscriber may be notified, for example, over the control channel to indicate that the call attempt encountered congestion and the call details are stored or otherwise recorded within the communication system. Such a notification may be sent via a control channel message, a SMS message or the like and may be used to inform the calling party that a call exists that is awaiting completion due to cell congestion. It should be noted that in accordance with the present invention, several calls may become subject to call completion. Accordingly, the notification may further allow the calling party to query the call completion service and request that certain of one or more calls awaiting completion be re-attempted or canceled. Further, for example, a special access code may be provided so that only an authorized party may cancel or request a re-attempt of a call awaiting completion. Further uses of such a notification may be possible in accordance with an exemplary embodiment of the present invention in that when a mobile station receives the notification, the mobile station may then be configured to notify the system when camping on a control channel for a another cell thus providing an addition manner in which the location of the mobile may be determined for the purposes of call completion or for other location purposes. It should be noted that in accordance with the present embodiment, e.g. where congestion is encountered in the calling or originating cell, no voice channel is established, thus notification via voice prompts may not be possible.

Other forms of notification may also be possible when congestion is encountered in, for example, the terminating cell. For example, a voice based prompt may be sent to the calling party informing calling party that congestion has occurred and requesting whether the call attempt should become subject to call completion in accordance with the call completion service. The calling party may acknowledge that call completion is desired by responding affirmatively. For example, the calling party may activate the hook FLASH button, or may otherwise interact with the service via a user interface provided by, for example, the equipment associated with the calling party, such as a display and keypad. It should be noted that notification in accordance with the call completion service may be provided in the above described manner to the calling party regardless of which party is eligible for the service.

If congestion is encountered in a terminating cell, notification may further be provided to the terminating or called party. Accordingly, notification in the form of, for example, a new control channel message, a SMS message or the like may be provided to inform the called party that an inbound call awaiting completion due to cell congestion has been placed. In a manner similar as described herein above, the notification may be used to allow the called party to request inbound call attempts to be re-attempted or to request that inbound call attempts be canceled. It will be appreciated that such forms of notification as have been described will be useful, for example, with reference to steps shown and described hereinafter with reference to FIG. 2C.

If positive acknowledgment is received to notification regarding activation of call completion service, the congestion may be monitored by a network device, e.g. MSC 1 110 in step 214, in a conventional manner. MSC 1 110 may supervise congestion within an affected cell in service area 115 for a traffic channel which may become available or for a specified threshold number of available traffic channels which may become available and may continue until: a traffic channel or threshold number of traffic channels becomes available; an MS associated with the supervised cell has moved to another cell, the detection of which is described in greater detail herein below; or a time limit, if any, expires within which the call must be completed. When the congestion dissipates, processing flow may proceed to branch 3 at 215. In the case where notification is not required, processing may proceed directly from step 212 to step 214.

Figure 2C:
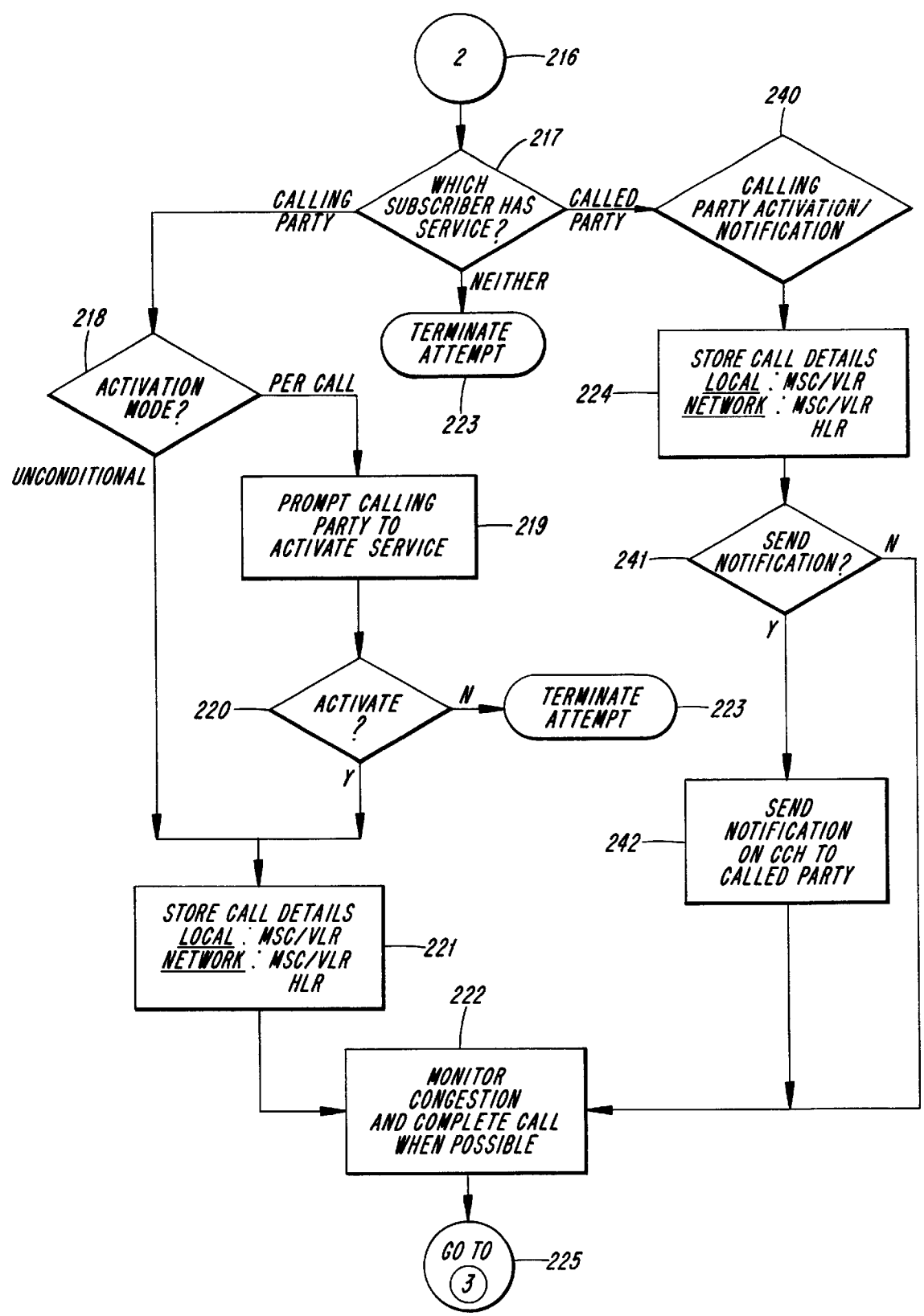
FIG. 2C is a flowchart illustrating further exemplary steps in accordance with still another exemplary embodiment of the present invention.

For congestion encountered in a called party cell as described, processing flow may proceed according to branch 2 216 as illustrated in FIG. 2C. A determination may be made at step 217 regarding which party is eligible for call completion service and, for example, notification may be provided in any of the manners as set forth herein above. In the case of the calling party being eligible for the service, the activation mode may further be determined in step 218. If the activation mode is on a per call basis, a prompt may be provided in step 219 to allow the calling party to activate the service for the particular call attempt underway. If activation is desired for the particular call attempt, as determined at step 220, details may be stored at step 221 in a manner similar as previously described with reference to step 211. In alternative embodiments for activation of the service by called subscribers in accordance with the present invention, lists of calling subscribers may be used such as, for example, a predefined restricted list including calling subscribers, calls from which may be blocked from the service, or a predefined unrestricted list including calling subscribers, calls from which may be eligible for the service.

It should be noted that call completion service in accordance with the present exemplary embodiment associated with the terminating side of a mobile call and, for example, the use of lists, may depend upon the availability of a calling party's number at various points in wireless communication system 100 or otherwise within the network where the service is supported. For systems which do not support automatic transfer of calling party identity, prefixes or suffixes may be used as an alternative. When a calling party activates the service using, for example, a prefix or suffix associated with the called party number, the network may use the prefix or suffix to ensure that the call is switched through the network in trunk devices which have a signaling system capable of transferring the calling party identity. It should be noted that in accordance with the present exemplary embodiment, a prefix, for example, may be used in B-number analysis and routing analysis to select trunk device capable of sending the calling party identity. If the activation mode is unconditional, processing may proceed directly between steps 218 and 221. Once call details are stored in step 221, the congested cell may be monitored in step 222 and processing may proceed to branch 3 225. It should further be noted that notification may be provided either before or after storing details associated with the call, e.g. at step 221, once congestion is detected and it is determined that the service is available.

In accordance with the present embodiment, when it is determined at step 217 that the called party has the service, notification of the calling party may be performed as shown in step 240. Accordingly, details associated with the call may be stored in step 224 in a manner as previously described with reference to, for example, step 221. In addition, it may be determined if notification should be sent to the called party in step 241 and, if so, a notification may be sent in accordance with the description provided herein above, e.g. by sending a control channel message, an SMS message or the like. Once acknowledgment of the notification is provided, congestion monitoring may proceed in step 222 as described.

Figure 2D:
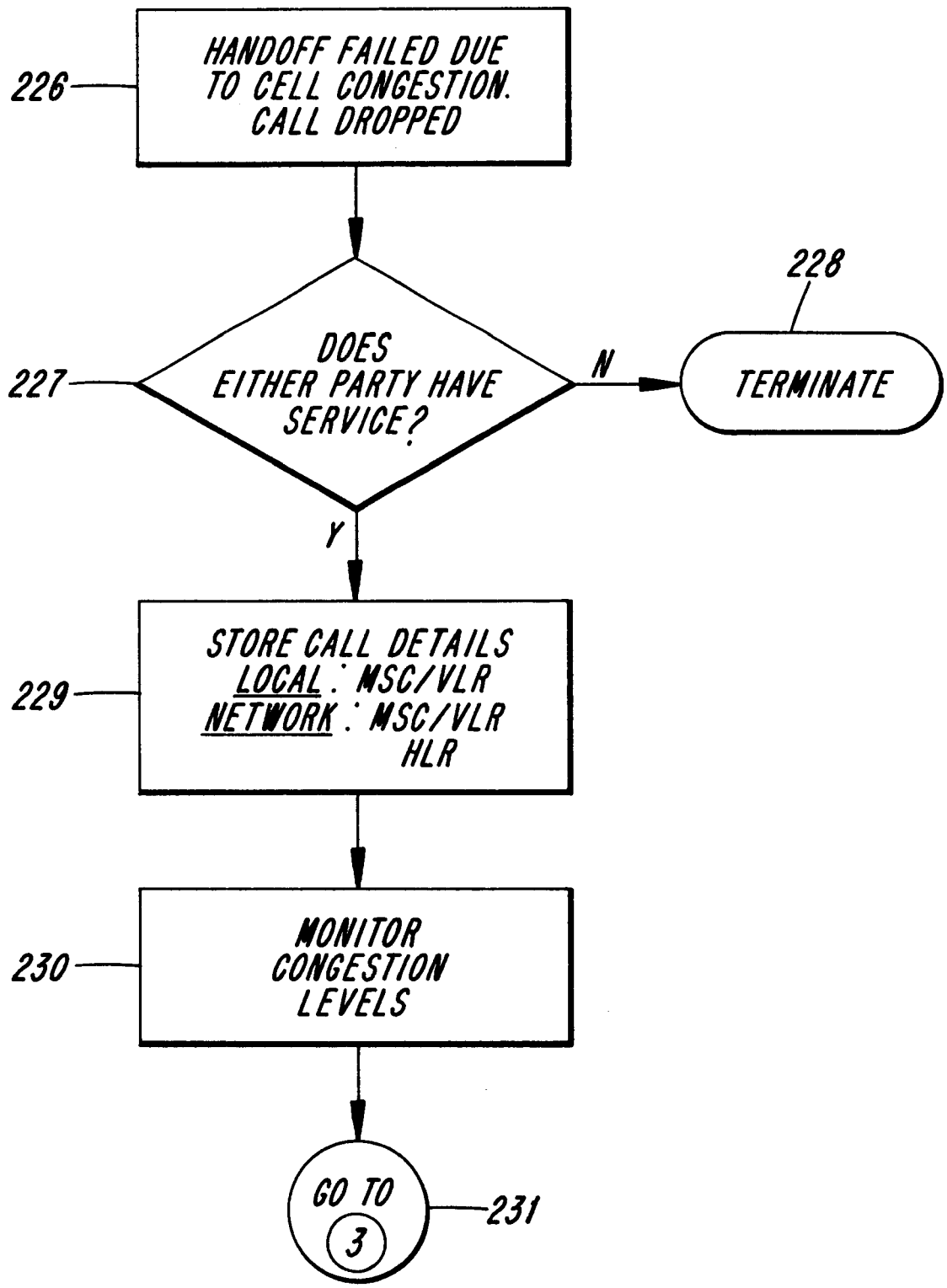
FIG. 2D is a flowchart illustrating further exemplary steps in accordance with still another exemplary embodiment of the present invention.

In accordance with another exemplary embodiment as illustrated in FIG. 2D, a call in progress may be lost due to cell congestion when cell handoff/handover is required as in step 226. If a call is lost at handoff/handover because no traffic channels are available in the cell or cells which could provide coverage to the moving MS, and either subscriber is eligible for the service as determined in step 227, call details may be stored in step 229, for example, in one or more of MSC 2 111 or VLR 113, and possibly HLR 114 as described with reference to step 211, depending on level of service provided. MSC 2 111 associated with moving MS subscriber, such as MS 130 may supervise congestion at step 230 in the cell to where a handoff was attempted, such as cell 132 from cell 131. Monitoring at step 230 may proceed to step 231 where steps, as further described with reference to FIG. 3, may be performed associated with continued monitoring and call setup when conditions allow. It should be noted that cell 131 must be treated differently from normal congested cells in providing a call completion or, more accurately, call restoration on cell congestion. Specifically, a call setup in cell 131 could result in poor quality and further loss of the restored call if congestion conditions causing the original handoff are still present. Cell 131 may not be used for set up of a restored call unless information is received by, for example, MSC 2 111 indicating that MS 130 is in a position where the quality of the call would not result in a further handoff and loss of the call. Such information may be used to determine whether a restored call would have sufficient quality within cell 131 and accordingly such determination may be made by methods including, for example, the use of radio quality measurement from any subsequent calls established on MS 130 within cell 131, use of a mobile positioning request to MS 130 in idle mode to determine its position, reading MACA information from MS 130 in idle mode. In addition, if MS 130, for example, moves to another cell and establishes a connection to a control channel of the new cell, and subsequently returns to cell 131 where the call was lost, then it is probable that the call could now be set up in cell 131 with a high likelihood that the quality will be better than the quality that existed in cell 131 when the call was lost.

Further in accordance with an exemplary embodiments of the present invention as illustrated in FIG. 3, processing control may proceed along branch 3 301 from a number of exemplary scenarios where congestion monitoring or supervision is in progress. During congestion monitoring or supervision, several events may occur as may be represented, for example, by exemplary event 310, wherein one or more voice channels becomes available in the congested cell, exemplary event 320, wherein it is determined that the party experiencing congestion in an associated cell, such as MS 130, has moved to another cell within same service area, and exemplary event 330, wherein it is determined that MS 130 has moved to a cell in a different service area (e.g., 115). It will be appreciated that a number of methods may be used to determine whether MS 130 has moved to another cell within same service area or to a different service area as in events 320 and 330. In the event no movement has occurred or if no traffic channel becomes available within a predetermined amount of time, e.g. a timeout period, as shown in step 370, then the call attempt may be automatically terminated, or, alternatively, a user may manually cancel the call completion service for the established call at step 380.

It should be noted that any combination of the following conditions or actions may be used to determine which cell the party associated with the cell experiencing congestion, e.g. the 'congested party' is in such as, for example, registration of MS 130 in a different Location Area, a page for MS 130 in a cell where the 'congested party' was when congestion occurred (absence of a response indicates possible movement elsewhere), an indication of the existence of 'congested party' in another cell based on extracellular activities such as originating or terminating call attempt, SMS activity, periodic registration, non call related paging or any other mobile station to base station communication occurring outside the originating cell. In accordance with an alternative exemplary embodiment, another mechanism may be used for determining by the system whether a 'congested party' is on a control channel associated with a different cell. In the present embodiment, the associated MS may send an unconditional message to a base station upon moving from the control channel associated with the original cell to a control channel associated with a new cell. It should be noted that such a message issued upon cell change is particularly effective, for example, as in event 330, where MS 130 has moved to a new VLR. In this case and in similar exemplary cases, a profile associated with MS 130 may be read from HLR 114 in step 331, and a determination may be made as to whether a call attempt is awaiting call completion as in step 332 in accordance with the present invention. Moreover, it is desirable that MS 130 be aware of the existence of a call to be completed once congestion conditions are removed to facilitate call completion processing. It should further be noted that such alternative embodiments may be used as part of an overall mechanism helping to reduce system load and easing for example, call supervision load, associated with call completion upon cell congestion in accordance with the present invention. If congestion eases, a call may be set up towards both parties, in a manner to be described in greater detail herein below, once the supervising MSC detects that a traffic channel or block of traffic channels is available in the cell where the previously congested party resides. In the event where called party, such as, for example, MS 130, moves to a coverage area associated with another cell such as cell 132 from cell 131 during the course of congestion monitoring, one of two actions may be performed as follows: a check may be performed to determine whether there is an available traffic channel in new cell 132; or a call may be attempted to be setup to the party concerned at that time. In either case, if congestion is encountered again, MSC 2 111, may resume supervision as in step 222 or 214 etc. In such an exemplary scenario, after storing the attempted call information at step 221, the call may subsequently be completed when, for example, a free traffic channel is available in the previously congested cell and the calling party is still within the same cell.

Still further in accordance with the present exemplary embodiment, as illustrated in FIG. 3, once congestion dissipates in the affected cell or cells and events 310, 320, and 330 are resolved, wireless communication system 100 in accordance with the present invention may contact the associated calling party and called party and may employ different mechanisms to set-up the previously unsuccessful call. In step 340, for example, a call leg to a previously congested party may be set up, in step 350, a call leg to the other party may be set up, and the call may proceed according to conventional call handling and supervision as in step 360. It should further be noted that depending on which party, the called or calling party encounters congestion, and depending on service level or the particular manner in which the service is provided, several mechanisms or service options may be used to complete the call. One mechanism may include, for example, a calling party being contacted using a distinctive ring. Use of a distinctive ring may be particularly suitable if already supported in wireless communication system 100 or could be provided as an additional enhancement for wireless communication systems designed in accordance with the present invention. Additional mechanisms may include, for example, contacting both calling party and called party prior to connecting the parties, contacting the calling party and requesting using, for example, a voice request to determine whether the calling party wishes to proceed with the setup of the previously congested call at which time keypad selections associated with a series of voice-relayed options may be made. Alternatively, the calling party may respond to the request with a hook FLASH option. When the calling party, through whatever mechanism, affirmatively acknowledges the request for a connection, establishing the call leg to the called party may then be attempted.

It should be noted that call completion in accordance with the present exemplary embodiment of the present invention, as previously described, may be provided as a service. Activation of such service may be done in various different ways including, for example, a subscriber service category associated with the subscriber requesting that calls encountering congestion be completed once the congestion condition no longer exists, a prefix or suffix added to the called party number indicating that the call should be handled in accordance with call completion on cell congestion service.

In yet another exemplary embodiment in accordance with the present invention, different levels of service may be provided by the call completion on cell congestion service such as, for example, service confined to an area covered by MSC 1 VLR 112; service confined to a particular area within the coverage of MSC 1 110, e.g cells covering a business district likely to become congested; or a service in accordance with the present invention may be provided on a network wide basis covering the entirety of wireless communication system 100 and perhaps beyond to adjoining networks.

As previously described, in the case where service is confined to a particular VLR, or in the case where the service is provided within MSC 1 110 and VLR 112 where congestion occurs, call details may be stored in VLR 112 associated with the congested cell and, with the assistance of MSC 1 110, the call may be completed once the congestion has dissipated, and the affected subscriber is still within VLR 112's specified coverage area. In the case where a call completion service is provided on a network wide basis, call details may be stored within VLR 112 and HLR 114. If the affected subscriber remains within the 'coverage' area of VLR 112 it was within when congestion was detected, then the call may be completed when congestion dissipates as previously described. If, however, the affected subscriber moves to another VLR, or returns to original VLR 112 after, for example, cycling power, call details may be transferred from HLR 114 to the new VLR. It should be noted that call information may be transferred to the VLR from, for example, HLR 114 when the subscriber register in the VLR and HLR 114 indicates that a call that encountered congestion is awaiting completion. It should further be noted that information may be requested by the VLR when a MS informs the VLR that a call encountering congestion must be completed. The MS may initiate the VLR request preferably only when the air interface supports call completion on cell congestion.

Thus a call completion service in accordance with the present invention, which may operate upon encountering cell congestion provides a service to end-users and provides increased revenues to operators and service providers as the number of successful calls increases due to overall increased throughput during busy periods. The call completion service may aid in the providing of a level of service to mobile subscribers comparable to that of fixed line subscribers by providing improved access to the network and superior service to priority subscribers.

The invention has been described herein with reference to particular embodiments. However, it will be readily apparent to those skilled in the art that it may be possible to embody the invention in specific forms other than those described above. This may be done without departing from the spirit of the invention. Embodiments described above are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of call completion in a wireless communication system, the method completing a call attempt between a calling party and a called party when either the calling party or the called party encounters congestion in a respective cell, the method comprising the steps of:

determining that the call attempt has failed due to a high congestion level in either the calling party's cell or the called party's cell;

storing information related to the call attempt;

monitoring available traffic channels in the cell affected by the high congestion level to determine when a sufficient number of traffic channels are available to set up a call without causing congestion in the affected cell;

determining whether the calling party and the called party are still within their respective cells;

if either the calling party or the called party has moved to a new cell, determining whether a sufficient number of traffic channels are available in the new cell to set up the call without causing congestion in the new cell; and setting up the call to complete the call attempt upon determining that a sufficient number of traffic channels are available to set up a call without causing congestion in the cells in which the calling party and the called party are located.

2. The method of claim 1, wherein the step of determining whether the calling party and the called party are still within their respective cells includes the steps of:

monitoring for the occurrence of one or more of the following:

registration of the calling or the called party In a new respective cell, call-related activity associated with the calling or the called party in the new respective cell, messaging activity associated with the calling or the called party in the new respective cell, unanswered paging messages associated with the calling or the called party in the respective cell, answered paging messages associated with the calling or the called party in the new respective cell, control channel activity associated with the calling or the called party in the new respective cell, and mobile positioning information associated with the calling or the called party indicating that the calling or the called party is within the coverage area associated with the new respective cell;

if none of the monitored occurrences are detected, determining that the calling or the called party are within the coverage area associated with the respective cell; and if at least one of the monitored occurrences is detected, determining that the calling or the called party are within the coverage area associated with the new respective cell.

3. The method of claim 1, wherein the step of setting up the call further includes the steps of:

contacting the calling party when it is determined that the affected cell is no longer congested;

requesting confirmation that the call associated with the call attempt should be set up; and setting up the call if confirmation is provided by the calling party.

4. The method of claim 1, further comprising, after determining that the call attempt has failed due to a high congestion level, the steps of:

notifying the calling or the called party that congestion is encountered; and prompting the notified party to indicate whether the call attempt should be subject to the call completion service.

5. The method of claim 4, further comprising, after prompting the notified party to indicate whether the call attempt should be subject to the call completion service, the step of prompting the notified party to indicate whether one or more additional stored call attempts should be re-attempted.

6. An apparatus for completing a call attempt in a wireless communication system between a calling mobile station (MS) and a called MS when either the calling or the called MS encounters cell congestion in a respective cell, the apparatus comprising:

at least one mobile switching center (MSC) having at least one storage register for storing information related to the call attempt; and an interface coupling the MSC to the calling MS and the called MS;

wherein the MSC is configured to:

determine that the call attempt has failed due to a high congestion level in either the calling MS's cell or the called MS's cell;

monitor available traffic channels in the cell affected by the high congestion level to determine when a sufficient number of traffic channels are available to set up a call without causing congestion in the affected cell;

determine whether the calling MS and the called MS are still within their respective cells;

determine whether a sufficient number of traffic channels are available in the new cell to set up the call without causing congestion in the new cell, upon determining that either the calling MS or the called MS has moved to a new cell; and set up the call to complete the call attempt upon determining that a sufficient number of traffic channels are available to set up a call without causing congestion in the cells in which the calling MS and the called MS are located.

7. The apparatus of claim 6, wherein the MSC, as configured to determine whether the calling MS and the called MS are still within their respective cells, is further configured to:

monitor for the occurrence of one or more of the following:

registration of the calling or the called MS in a new respective cell, call-related activity associated with the calling or the called MS in the new respective cell, messaging activity associated with the calling or the called MS in the new respective cell, unanswered paging messages associated with the calling or the called MS in the new respective cell, answered paging messages associated with the calling or the called MS in the new respective cell, the control channel activity associated with the calling or the called MS in the new respective cell, and mobile positioning information associated with the calling or the called MS indicating that the calling or the called MS is within the coverage area associated with the new respective cell;

determine that the calling or the called MS is within the coverage area associated with the respective cell if none of the monitored occurrences are detected; and determine that the calling or the called MS is within the coverage area associated with the new respective cell if at least one of the monitored occurrences is detected.

8. The apparatus of claim 6, wherein in setting up the call, the MSC is further configured to:

contact the calling MS when it is determined that the affected cell is no longer congested;

request confirmation that the call associated with the call attempt should be set up; and set up the call if confirmation is provided by the calling MS.

9. The apparatus of claim 6, wherein, upon determining that the call attempt has failed due to a high congestion level in either the calling MS's cell or the called MS's cell, the MSC is further configured to:

notify the calling or the called MS that the call attempt was not completed; and prompt the notified MS to indicate whether the call attempt should be subject to the call completion service.

10. The apparatus of claim 9, wherein the MSC is further configured to prompt the notified MS to indicate whether one or more additional stored call attempts should be re-attempted.

* * * * *